P. A. DUPCZA.
MACHINE GUN.
APPLICATION FILED AUG. 5, 1910.

990,642.

Patented Apr. 25, 1911.

WITNESSES

INVENTOR
P. A. Dupcza
by
Attorneys

P. A. DUPCZA.
MACHINE GUN.
APPLICATION FILED AUG. 5, 1910.

990,642.

Patented Apr. 25, 1911.

WITNESSES

INVENTOR
P. A. Dupcza.

by

Attorneys.

P. A. DUPCZA.
MACHINE GUN.
APPLICATION FILED AUG. 5, 1910.

990,642.

Patented Apr. 25, 1911.
7 SHEETS—SHEET 6.

UNITED STATES PATENT OFFICE.

PETER A. DUPCZA, OF LYNDORA, PENNSYLVANIA.

MACHINE-GUN.

990,642.

Specification of Letters Patent.  Patented Apr. 25, 1911.

Application filed August 5, 1910. Serial No. 575,633.

*To all whom it may concern:*

Be it known that I, PETER A. DUPCZA, a citizen of the United States of America, residing at Lyndora, in the county of Butler and State of Pennsylvania, have invented certain new and useful Improvements in Machine-Guns, of which the following is a specification, reference being had therein to the accompanying drawing.

This invention relates to machine guns, and the objects of my invention are to provide a gun with means as will be hereinafter set forth for simultaneously firing or discharging a large number of cartridges, and to furnish simple and effective means whereby the gun can be expeditiously loaded and recharged after having been fired.

Further objects of the invention are to furnish a machine gun with novel means whereby certain predetermined groups of cartridges can be fired while others are held in reserve, and to provide novel means in connection with a gun of the above type for anchoring the same and compensating for the recoil of the gun when discharged.

These and such other objects as may hereinafter appear are attained by a machine gun embodying novel elements or combinations of the same, which considered as an entirety produce a gun that is highly efficient for warfare purposes.

It is thought best on account of the novel construction entering into the invention to consider the various organizations of the elements under separate captions and then to further consider the same collectively in connection with the general operation of the gun.

The gun embodies, first, a carriage; second, an anchoring and recoil device; third, a barrel; fourth, a cartridge reloader and extracting or ejecting device; fifth, a breech block and the firing pins thereof, and sixth, the firing mechanism; all to be separately considered.

Reference will now be had to the drawings forming part of this specification, wherein there is illustrated a preferred embodiment of the invention, but it is to be understood that the structural elements thereof are susceptible to such changes as fall within the scope of the appended claims.

Figures 1, 2, 3, 4, 5:
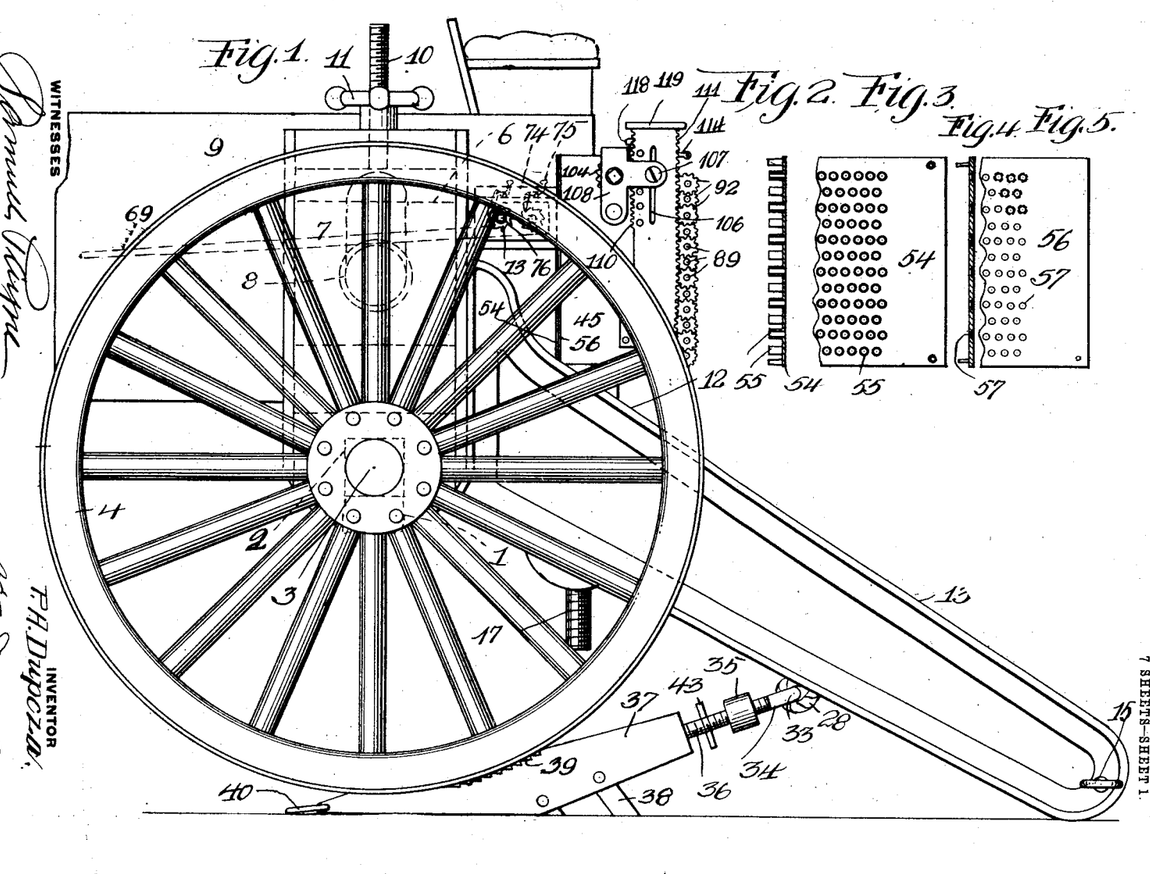
—Figure 1 is a side elevation of the gun.
Fig. 2 is a vertical sectional view of the cartridge loader.
Fig. 3 is a front elevation of a portion of the same.
Fig. 4 is a vertical sectional view of the cartridge extracting or ejecting device.
Fig. 5 is a front elevation of a portion of the same.
Figure 6:
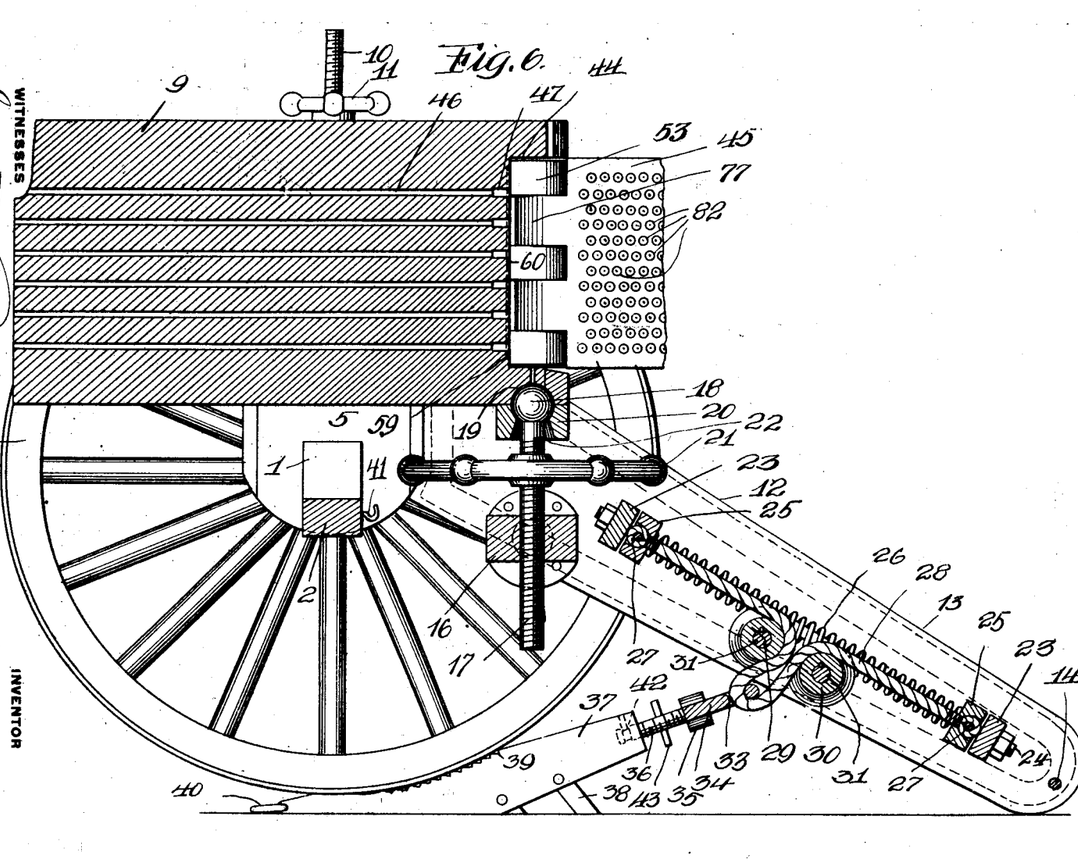
Fig. 6 is a longitudinal sectional view of the gun, showing the breech block open and partly broken away.
Figure 7:
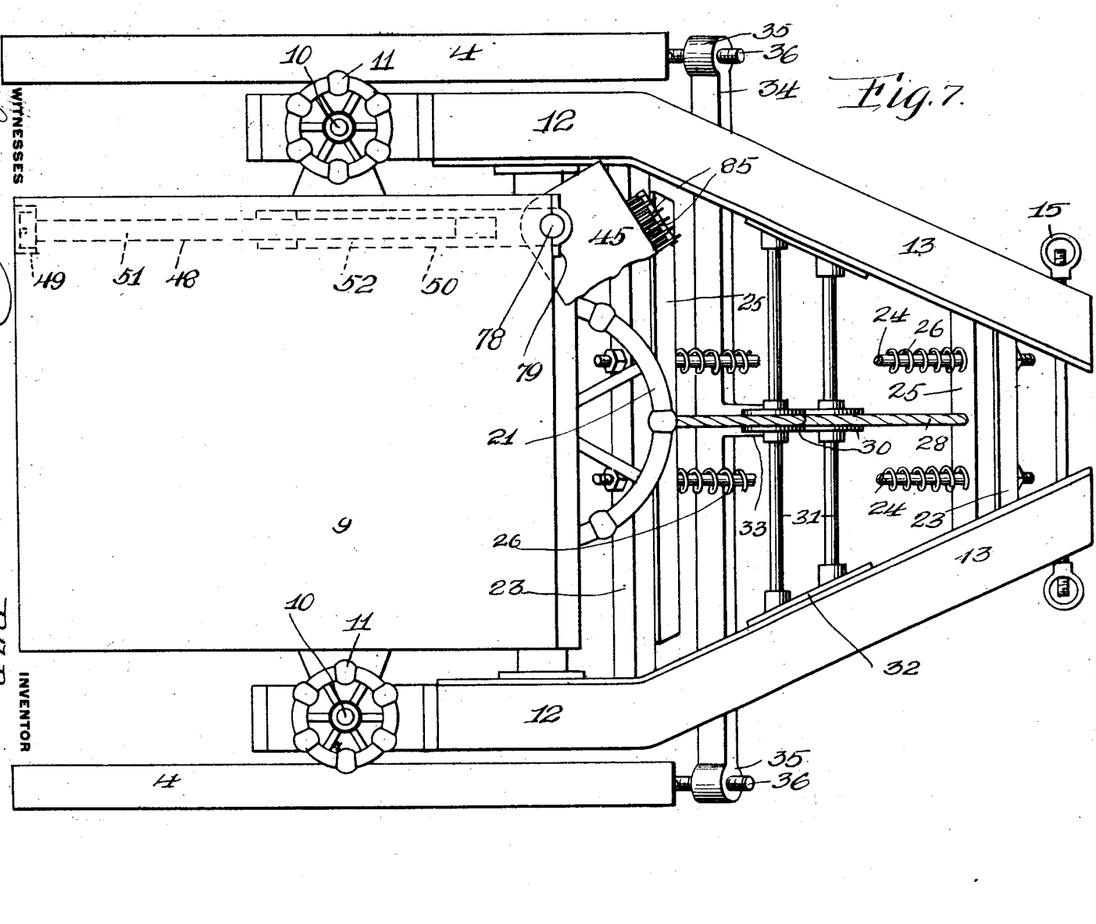
Fig. 7 is a plan of the gun with the breech block thereof partly broken away.
Figure 8:
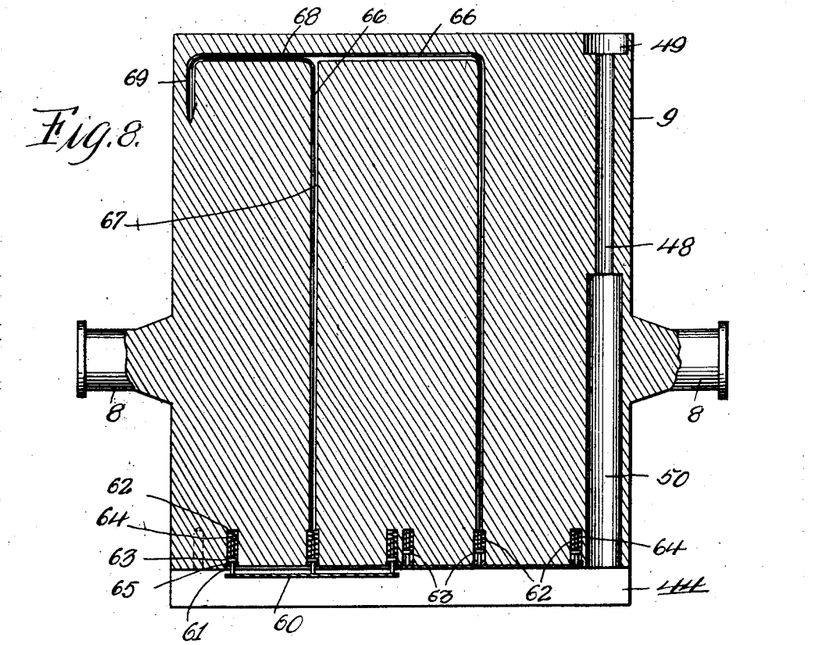
Fig. 8 is a horizontal sectional view of the barrel of the gun, showing the cartridge extracting or ejecting device.
Figure 9:
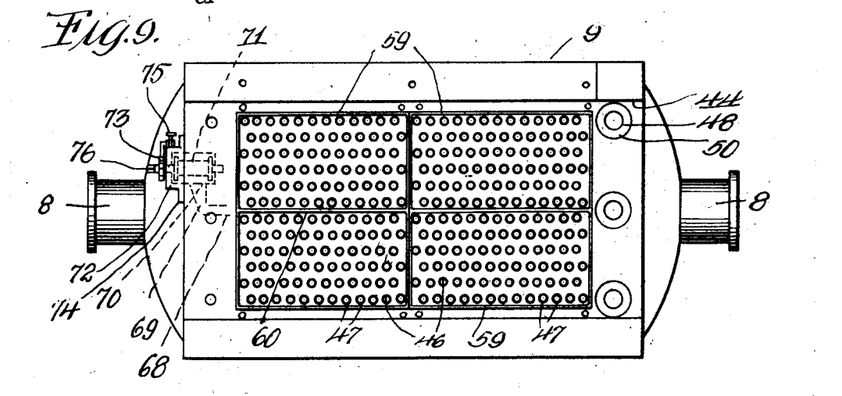
Fig. 9 is a view of the rear end of the gun barrel.

*Carriage.*—The carriage comprises an axle 1 having a central depressed portion 2 and the spindles 3 thereof provided with revoluble wheels 4. The axle 1 adjacent to the wheels 4 is provided with cheek plates 5 having openings 6, and adjustably mounted in the openings 6 of the cheek plates are bearing blocks 7 for the trunnions 8 of the gun barrel 9. The bearing blocks 7 are adjusted through the medium of screws 10 and hand wheels 11. The cheek plates 5 are provided with rearwardly extending inclined frames 12 having the ends 13 thereof converged and connected by a tie rod 14 and nuts 15, these frames constituting the stock or tail-piece of the gun adapted to rest upon the ground and assist in anchoring the gun. The frames 12 beneath the lower rear end of the barrel 9 are connected by a transverse beam 16 and adjustably mounted centrally of said beam is a vertical screw 17. The upper end of this screw is provided with a ball 18 loosely mounted in a socket 19 provided therefor in the under side of the barrel 9 at the rear end thereof, the ball 18 being retained in the socket by a socket plate 20. The screw 17 is provided with a large hand wheel 21 whereby the screw 17 can be easily rotated to raise and lower the rear end of the barrel, and the socket plate 19 is cut away, as at 22 to provide clearance for the screw and to allow the barrel to be tilted at a desired inclination.

*Anchoring and recoil device.*—The frames 12 have the upper and lower ends thereof connected by transverse bars 23 and these bars are connected by longitudinal guide rods 24 arranged in parallelism. Slidably mounted upon the rods 24 are cross heads 25, and encircling the guide rods 24 between said heads are coiled compression springs 26. Connected to the heads 25 intermediate the ends thereof are the ends 27 of a cable 28, said cable having the intermediate portion thereof looped, as at 29 between and below two grooved sheaves 30 mounted upon transverse shafts 31 journaled in bearings 32, carried by the inner sides of the frames 12. The looped portion of the cable 28 passes through an eye 33, carried by a beam 34 having the ends thereof provided with screw sockets 35 for screw bolts 36. The screw bolts 36 are carried by the rear ends of chuck blocks 37 supported upon the ground at an inclination to the wheels 4 by inclined legs 38 mounted in the under side of said blocks. The legs 38 serve to anchor the chuck blocks, and these blocks are toothed or serrated, as at 39 to engage the rims of the wheels 4 and assist in preventing said wheels from moving when the gun is discharged. The forward ends of the chuck blocks 37 are provided with links 40 and when the blocks are not in use, said links are attached to hooks 41, carried by the rear side of the axle 1, these hooks supporting the chuck blocks while the gun is being moved. The screw bolts 36 are rotatably connected to the rear ends of the chuck blocks 37, as at 42 and are provided with handles 43 whereby said screw bolts can be rotated to adjust the chuck blocks 37 relatively to the beam 34.

*The gun barrel.*—The gun barrel 9 is rectangular and has the rear end thereof cut away to provide an oblong pocket 44 for a breech block 45. The barrel is provided with longitudinal bores 46 extending from the forward end of the barrel to the rear end thereof, and these bores are arranged in parallel rows, with the bores of one row staggered with respect to the bores of adjoining rows, and the rear ends of the bores are enlarged, as at 47. The barrel 9 at one side thereof is provided with longitudinal openings 48, the ends of said openings being enlarged, as at 49, and as at 50, the enlargement 50 of said ends being approximately half the length of the openings 48. Mounted in the openings 48 are screws 51, said screws entering the shanks 52 of hinge members 52. The enlarged ends 49 of the openings 48 provide clearance for the screw-heads, and it is through the medium of these screws that the hinge members 53 are detachably held in engagement with the barrel 9.

*Cartridge loader and extracting or ejecting device.*—Fitted in the pocket 44 is a cartridge holding plate 54 having cartridge-supporting sleeves 55 extending into the enlarged ends 47 of the bores 46, said sleeves serving functionally as chambers for the cartridges. Mounted against the cartridge holding plate 54 is an extracting plate 56 having openings 57 formed therein adapted to register with the openings of the sleeves 55. The outer ends of the openings 57 are enlarged to accommodate the rim or cap of a cartridge. The rear end of the barrel is grooved, as at 58, for two rectangular ejecting frames 59, these frames having transverse braces 60. The frames 59 are provided with projecting pins 61 extending into sockets 62 formed in the rear end of the barrel 9. The pins 61 are provided with heads 63 and encircling said pins between the head 63 and the rear ends of the socket 62 are compression springs 64. The springs 64 are normally retained under tension and the heads 63 within the sockets by plugs 65 threaded in the outer ends of said sockets. It is preferable to provide five sockets in connection with each frame and to locate the pins 61 at the corners of the frame and another pin intermediate the ends of the transverse braces 60. The pins 61 and the transverse braces 60 are attached to cables 66 extending through longitudinal bores 67 provided therefor in the barrel 9, said bores extending within proximity of the forward end of the barrel and communicating with a transverse bore 68, which in turn communicates with an angularly disposed bore 69 extending from the bore 68 rearwardly to a cavity 70 formed in the side of the barrel 9 at the rear end thereof. The cables 66 extend from the bores 68 and 69 into the cavity 70 and are attached to spools 71 revolubly mounted in said cavity, the spools having the inner ends thereof journaled in the inner wall of the cavity, and the outer ends thereof journaled in a bearing plate 72 secured to the side of the barrel 9 and closing the cavity 70. The outer ends of the spools 71 are provided with ratchet wheels 73 and adapted to engage said wheels are pivoted gravity pawls 74 carried by levers 75 fulcrumed upon the top of the bearing 72. The outer ends of the spools 71 are furthermore provided with rectangular shanks 76 to receive cranks or handles (not shown) when it is desired to wind the cables 66 upon the spools 71 and hold the springs 64 under tension with the frames 59 seated in the grooves of the barrel.

Figure 11:
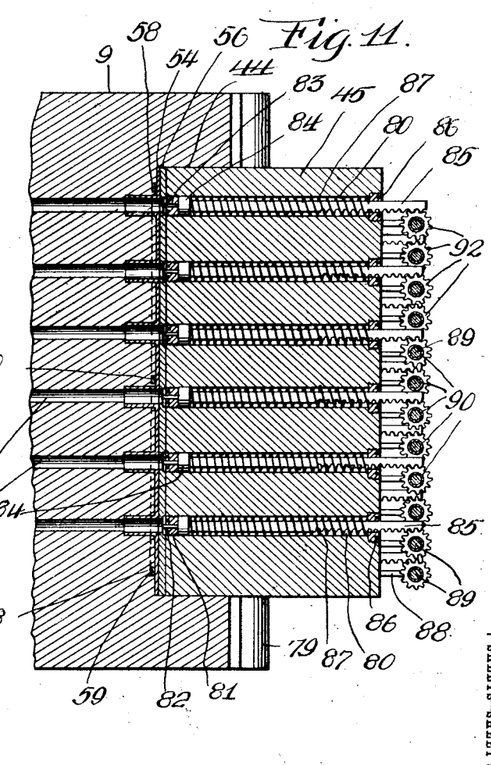
Fig. 11 is a longitudinal sectional view of the same, showing the breech block in a closed position.
Figures 12, 13, 14:
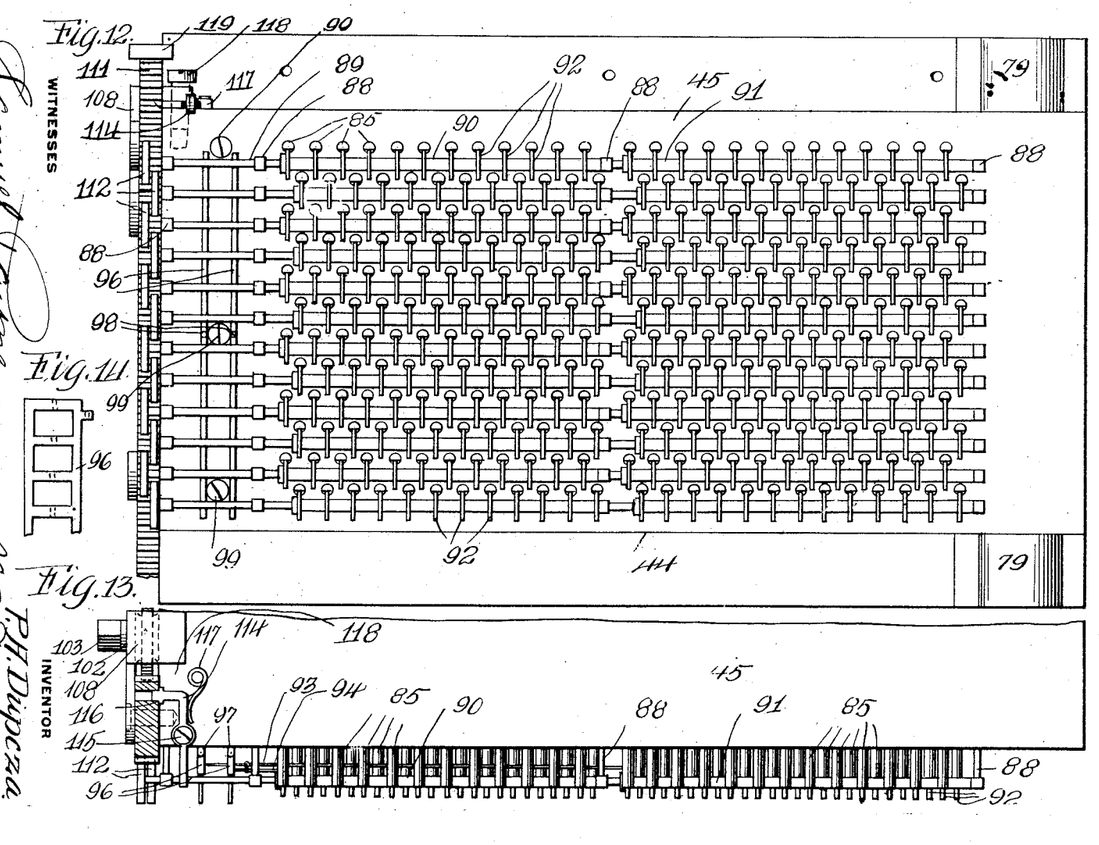
Fig. 12 is a rear elevation of the breech block.
Fig. 13 is a plan of the same.
Fig. 14 is an elevation of a portion of a detached pivoted bracket forming part of the firing mechanism.

*Breech block and the firing pins thereof.*—The breech block 45 is rectangular and is adapted to swing into the pocket 44, said block having one end thereof provided with hinge members 77 mounted between the members 53 and retained in engagement therewith by a pin 78, said pin having the upper and lower ends thereof connected to the rear end of the barrel 9 by straps 79. The breech block 45 is provided with longitudinally disposed openings 80 adapted to longitudinally aline with the openings 57 of the plate 56, the sleeves 55 of the plate 54 and the bores 46 of the barrel, said openings corresponding in number to the bores 46. Detachably mounted in the inner ends of the openings 80 are plugs 81 having longitudinal pin openings 82 formed therein adapted to receive firing pins 83, carried by cylindrical heads 84, connected to racks 85 extending longitudinally of the openings 80. The outer ends of the racks 85 extend through plugs 86 detachably mounted in the outer ends of the openings 80. Encircling said racks between the heads 84 and the plugs 86 are compression springs 87. The outer side of the breech block 45 is provided with a plurality of bearings 88, these bearings being arranged in transverse rows between the openings 80. Journaled in the bearings 80 are shafts 89 and slidably mounted upon each shaft and adapted to rotate therewith are sleeves 90 and 91. Upon each sleeve are mounted a plurality of pinions 92 adapted to mesh with the racks 85. Connected to each of the sleeves 90 and 91 are cables 93 and 94 respectively provided with hooks 95 and these hooks are adapted to be connected to brackets 96 pivotally supported by lugs 97 upon the outer side of the breech block. The pivoted brackets 96 are provided with handles 98 whereby they can be easily shifted. The breech block 45 is retained in a closed position by a plurality of screws 99.

Figure 10:
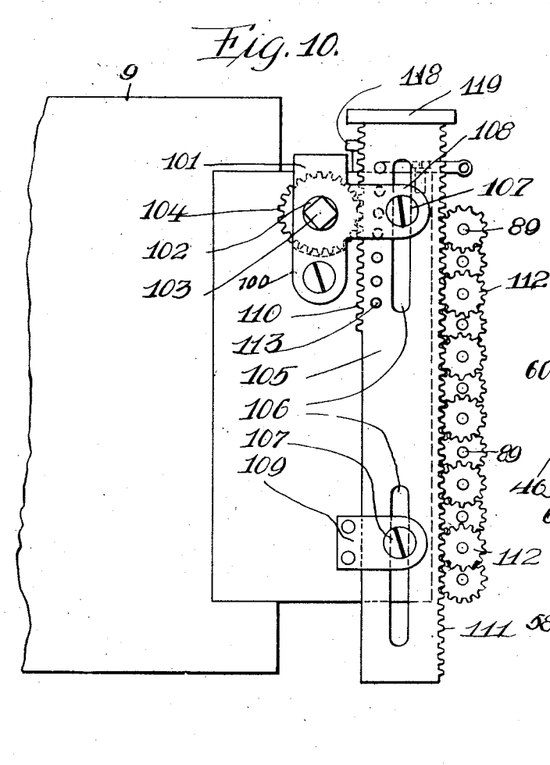
Fig. 10 is a side elevation of a portion of the same, showing the firing mechanism.

*Firing mechanism.*—The breech block 45 has that end thereof opposite the hinged members 77 provided with an extension 100 and the upper end of said extension is provided with a bracket 101. Journaled in the extension 100 and the bracket 101 is a shaft 102 having the outer end thereof rectangular, as at 103 to accommodate a handle or crank (not shown). Mounted upon the shaft 102 and the bracket 101 and the extension 100 is a pinion 104 meshing with a double rack movably supported by the extension 100. The double rack comprises a bar 105 provided with longitudinal slots 106 through which extend guide pins or screws 107, carried by an extension 108 of the bracket 101 and by a bracket 109 secured to the extension 100 adjacent to the lower edge thereof. The rear edge of the bar 105 is provided with teeth 110 adapted to mesh with the pinion 104 and the front edge with teeth 111 adapted to mesh with pinions 112 mounted upon the shafts 89, the pinions 112 being staggeredly arranged whereby the shafts 89 can be compactly arranged upon the outer side of the breech block 45. The bar 105 adjacent to the teeth 110 thereof is provided with openings 113 and adapted to engage in these openings is a spring pressed trigger 114 pivotally mounted, as at 115 upon the upper edge of the breech block 45. One end of the trigger 114 is provided with lugs 116 to limit the movement thereof in the openings 113, and this same end of the trigger is pressed by a spring 117 mounted upon the breech block 45. To limit the downward movement of the bar 105, the upper side of the breech block is provided with a set screw 118 that can be easily adjusted to limit the movement of the bar 105 by contacting with a head 119, carried by the upper end of said bar.

*General operation.*—Assuming that the cartridge holding plate 54 and the extracting or ejecting plate 56 have been loaded with cartridges and placed in the pocket 44, the breech block 45 is closed and secured by the screws 99. The breech block prior to being closed has the firing pins thereof set in a cocked position. This is accomplished by rotating the shaft 102, raising the rack bar 105 and through the medium of the openings 112 and 92, the racks 85 are shifted to move the firing pins 83 out of the openings 82 and place the springs 87 under tension. When the double rack bar 105 is elevated, the trigger engages in the lowermost opening 113, and when the gun is to be fired, the trigger 114 is moved out of engagement with the bar 105, and the tension of all the springs 87 is sufficient to immediately, and with considerable force, move the firing pins 83 into the openings 82 to discharge the cartridges within the sleeves 55. When the trigger 114 is released the tension of the springs 87 is sufficient to move the racks 85 rearwardly, rotate the shafts 89 and to allow the bar 105 to descend, the lowering movement of the bar being limited by the screw 118. During the firing of the gun should it be desired to cease firing, the trigger 114 can be released to engage in the first opening 113 encountered, but these openings are principally employed whereby the firing mechanism can be set to simultaneously fire all the cartridges after leaving the lowermost opening 113, the trigger engaging in the next opening, thus retaining the firing mechanism in position to fire another load of cartridges after the barrel is loaded. If it is desired to withhold the firing of certain portions of the gun, the brackets 96 can be shifted and through the medium of the cables 93 and 94 move the sleeves 90 and 91 respectively, thus moving the pinions carried by said sleeves out of engagement with the racks 85. After the gun has been fired, the breech blocks 45 can be immediately opened and by elevating the pawls 74 through the medium of the lever 75, the spools 71 will be unwound thus releasing the cables 66 and allowing the springs 64 to force the frames 59 outwardly, these frames moving the plates 54 and 65 outwardly whereby they can be easily removed from the pocket 44. The tension of the springs 64 is sufficient to move the frames 59, plates 54 and 56, consequently through the medium of the plate 56 the shells will be extracted. The frames 59 can be quickly restored to their normal position by winding the spools 71 and then the plates 54 and 56 can be placed in position. When the gun is fired the chuck blocks 37 are adapted to prevent the carriage from shifting and should the carriage shift, the means of anchoring the stock or tail-piece to the chuck blocks will to a certain extent compensate for the recoil of the gun. It is obvious that the heads 25 can shift upon the guide rods 24 and place the springs 26 under tension, and these springs normally retain the heads 25 in proximity to the bars 23. The screw 17 in connection with the beam 16 permits of the rear of the gun being raised or lowered, while the rearwardly extending stock or tail-piece permits of the gun being sighted or placed in proper alinement with the target or object.

Figure 15:
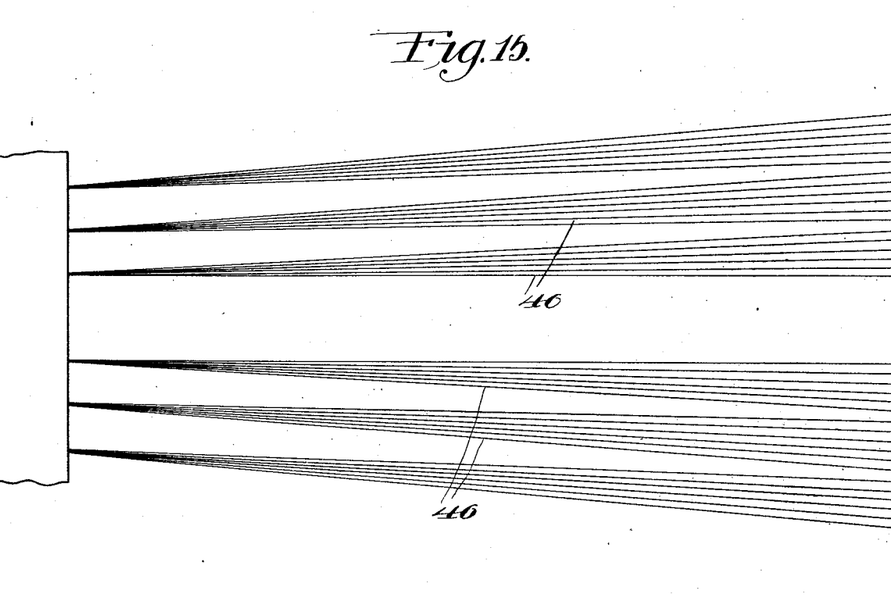
Fig. 15 is a diagrammatic view showing diverging bores for the gun barrel.

In Fig. 15 of the drawings there is diametrically illustrated diverging bores 46 for the gun barrel, these bores diverging from the rear of the gun barrel to the forward end thereof, whereby when the gun is discharged the shots or shell will be spread apart to cover a large area.

From the foregoing it is apparent that I have devised a novel rapid firing field piece or machine gun that can be attended with perfect safety and easily and quickly operated.

The invention is no wise limited to the size, number of cartridges discharged or the position of the barrel bores.

What I claim is:—

1. A gun of the type described, embodying a carriage, a barrel adjustably supported by said carriage and having a plurality of longitudinal bores formed therein, a breech block movably connected to the rear end of said barrel, said block having longitudinally disposed openings formed therein adapted to longitudinally aline with the openings of said barrel, spring pressed racks movably mounted in the openings of said breech block, firing pins carried by the inner ends of said racks, revoluble pinions supported at the outer side of said breech block for moving said racks outwardly to set said firing pins preparatory to firing the gun, and means carried by said breech block for simultaneously revolving said pinions.

2. A gun of the type described, embodying a carriage, a barrel adjustably supported by said carriage and having a plurality of longitudinal bores formed therein, a breech block movably connected to the rear end of said barrel, said block having longitudinally disposed openings formed therein adapted to longitudinally aline with the openings of said barrel, spring pressed racks movably mounted in the openings of said breech block, firing pins carried by the inner ends of said racks, revoluble pinions supported at the outer side of said breech block for moving said racks outwardly to set said firing pins preparatory to firing the gun, means carried by said breech block for simultaneously revolving said pinions, and means for releasing said pinions.

3. In a machine gun, the combination with a carriage having an anchoring and recoil device, of a barrel adjustably supported by said carriage, said barrel having longitudinal bores formed therein, a cartridge reloading device adapted to support cartridges in the rear ends of said bores, a breech block movably connected to said barrel, firing pins arranged in said breech block, a plurality of revoluble pinions supported by said breech block for setting said firing pins preparatory to firing the gun, means for simultaneously revolving said pinions, and means arranged within said breech block for moving said firing pins to fire the gun.

4. In a machine gun, the combination with a carriage having an anchoring and recoil device, of a barrel adjustably carried thereby, said barrel having a plurality of longitudinal bores formed therein, a cartridge reloading and extracting device arranged at the rear ends of said bores and adapted to support cartridges therein, a breech block movably connected to said barrel for closing the rear ends of said bores, spring actuated firing pins arranged in said breech block, and means carried by said breech block for setting said firing pins preparatory to firing the gun.

5. In a machine gun, the combination with a carriage having an anchoring and recoil device, of a barrel adjustably carried thereby, said barrel having a plurality of longitudinal bores formed therein, a cartridge reloading and extracting device arranged at the rear ends of said bores and adapted to support cartridges therein, a breech block movably connected to said barrel for closing the rear ends of said bores, spring actuated firing pins arranged in said breech block, means carried by said breech block for setting said firing pins preparatory to firing the gun, said means including a plurality of pinions, a rack meshing with some of said pinions and adapted to move all of said pinions, and means for releasing said rack to cause the discharge of said gun.

6. In a machine gun, the combination with a carriage, of a barrel adjustably supported thereby, said barrel having a plurality of longitudinal bores formed therein, a cartridge reloading device adapted to support cartridges in the rear ends of said bores, a cartridge extracting device coöperating with the cartridge reloading device, a breech block movably connected to said barrel for closing the rear ends of said bores, a firing mechanism carried by said breech block, and means extending forwardly in said barrel and then rearwardly to a point adjacent to said breech block for actuating said cartridge extracting device.

7. In a machine gun, the combination with a carriage, of a barrel adjustably supported thereby, said barrel having a plurality of longitudinal bores formed therein, a cartridge reloading device adapted to support cartridges in the rear ends of said bores, a cartridge extracting device coöperating with the cartridge reloading device and including spring pressed frames, a breech block movably connected to said barrel for closing the rear ends of said bores, a firing mechanism carried by said breech block, means extending forwardly in said barrel and then rearwardly to a point adjacent to said breech block for actuating said cartridge extracting device, said means including cables extending through said barrel, and a ratchet mechanism for winding said cables to restore said extracting frames to their normal position.

In testimony whereof I affix my signature in the presence of two witnesses,

PETER A. DUPCZA.

Witnesses:
EVA A. MILNE,
KARL H. BUTLER.

---

Copies of this patent may be obtained for five cents each, by addressing the "Commissioner of Patents, Washington, D. C."